(12) United States Patent
Sugiki

(10) Patent No.: US 9,047,911 B2
(45) Date of Patent: Jun. 2, 2015

(54) DISK DRIVE UNIT HAVING SEAL PART FORMING GAS-LIQUID INTERFACE OF LUBRICANT

(71) Applicant: Samsung Electro-Mechanics Japan Advanced Technology Co., Ltd., Shizuoka (JP)

(72) Inventor: Ryusuke Sugiki, Shizuoka (JP)

(73) Assignee: SAMSUNG ELECTRO-MECHANICS JAPAN ADVANCED TECHNOLOGY CO., LTD., Shizuoka (JP)

( * ) Notice: Subject to any disclaimer, the term of this patent is extended or adjusted under 35 U.S.C. 154(b) by 0 days.

(21) Appl. No.: 14/283,378

(22) Filed: May 21, 2014

(65) Prior Publication Data
US 2014/0355154 A1 Dec. 4, 2014

(30) Foreign Application Priority Data

May 31, 2013 (JP) ................................. 2013-115170

(51) Int. Cl.
*G11B 19/20* (2006.01)

(52) U.S. Cl.
CPC .................. *G11B 19/2036* (2013.01)

(58) Field of Classification Search
CPC .............. G11B 19/2036; F16C 17/107; F16C 32/0603; F16C 33/107; F16C 33/74; F16C 33/745
USPC ........................... 360/99.08; 310/90; 384/107
See application file for complete search history.

(56) References Cited

U.S. PATENT DOCUMENTS

| 8,593,758 | B2 | 11/2013 | Yamamoto et al. | |
|---|---|---|---|---|
| 8,873,198 | B1 * | 10/2014 | Iwasaki et al. | 360/99.08 |
| 2007/0140605 | A1 * | 6/2007 | Asada et al. | 384/107 |
| 2009/0309439 | A1 * | 12/2009 | Yamamoto | 310/90 |
| 2010/0226601 | A1 * | 9/2010 | Inazuka et al. | 384/107 |
| 2011/0033143 | A1 * | 2/2011 | Yamada et al. | 384/107 |
| 2011/0051591 | A1 * | 3/2011 | Yang | 369/264 |
| 2011/0064341 | A1 * | 3/2011 | Mizuno et al. | 384/114 |
| 2011/0154875 | A1 * | 6/2011 | Fukuzako et al. | 72/67 |
| 2011/0170813 | A1 * | 7/2011 | Hori | 384/114 |
| 2012/0183243 | A1 * | 7/2012 | Sugiki | 384/107 |
| 2013/0027807 | A1 * | 1/2013 | Hayashi | 360/99.08 |
| 2013/0235489 | A1 * | 9/2013 | Aoshima | 360/99.08 |
| 2014/0307347 | A1 * | 10/2014 | Ikeda | 360/99.12 |

FOREIGN PATENT DOCUMENTS

JP  2012-205375  10/2012

* cited by examiner

*Primary Examiner* — Angel Castro
(74) *Attorney, Agent, or Firm* — IPUSA, PLLC

(57) ABSTRACT

A disk drive unit includes a stationary body; a rotating body rotatably supported on the stationary body, a seal part configured to form a first gas-liquid interface of a lubricant existing in a gap between the stationary body and the rotating body, and a groove-shaped opening opposing the seal part and communicating to the gap via a communication hole. The seal part has a shape such that the gap gradually increases towards an aperture opposing the groove-shaped opening, and the groove-shaped opening has a shape such that the gap gradually increases towards an aperture opposing the seal part.

14 Claims, 5 Drawing Sheets

100

100

100

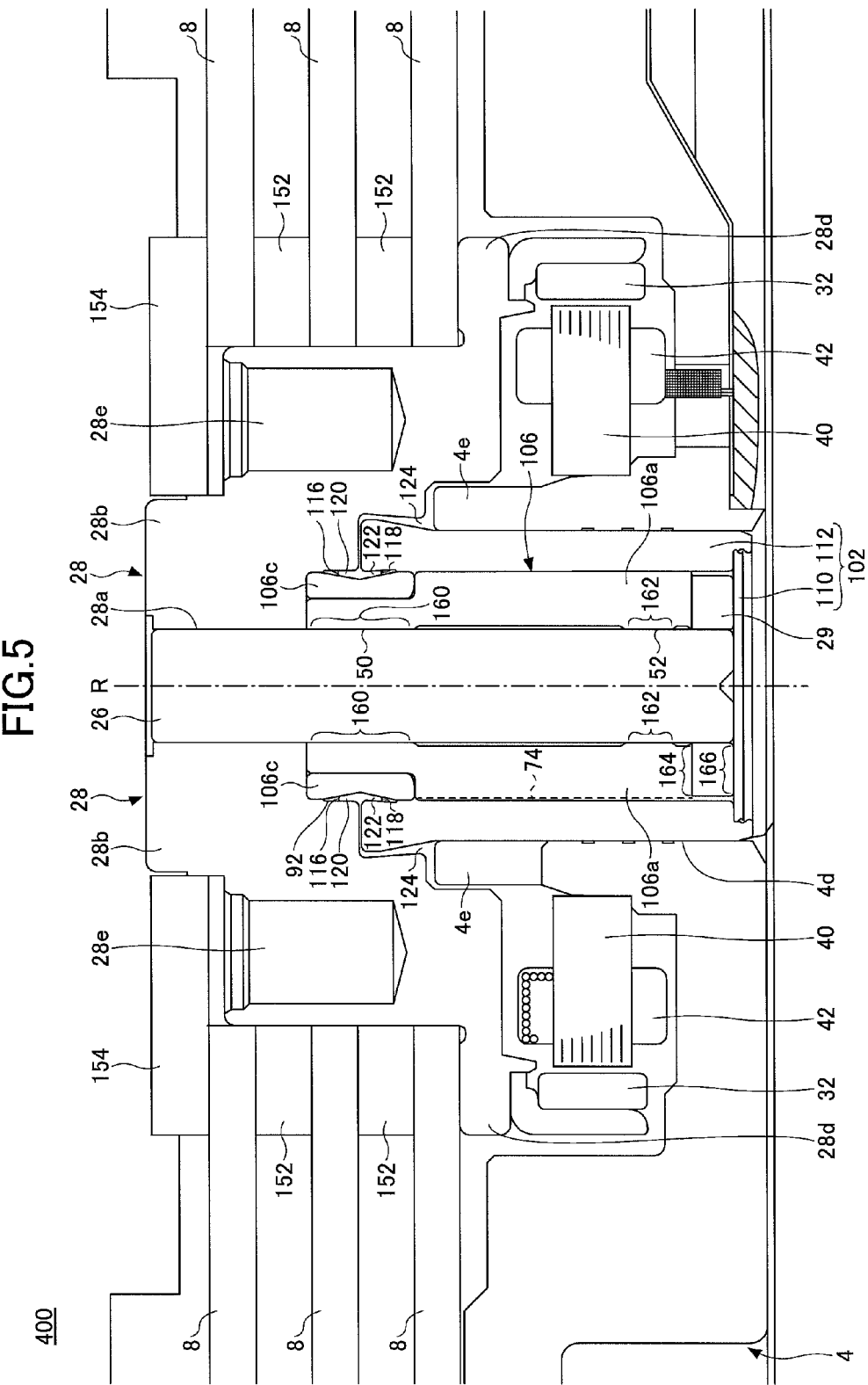

DISK DRIVE UNIT HAVING SEAL PART FORMING GAS-LIQUID INTERFACE OF LUBRICANT

CROSS-REFERENCE TO RELATED APPLICATIONS

This application is based upon and claims the benefit of priority of Japanese Patent Application No. 2013-115170 filed on May 31, 2013, the entire contents of which are incorporated herein by reference.

BACKGROUND OF THE INVENTION

1. Field of the Invention

The present invention relates to a disk drive unit.

2. Description of the Related Art

A disk drive unit, such as a HDD (Hard Disk Drive), for example, is one type of rotating device. The disk drive unit may use a fluid dynamic bearing that rotatably supports a disk by providing a lubricant between a rotating body (or rotor) and a stationary body (or stator).

In the disk drive unit mounted with such a fluid dynamic bearing, an operation error may occur when reading information from or writing information to the disk, if the lubricant scatters from between the rotating body and the stationary body and adheres onto a surface of the disk. Hence, in the disk drive unit mounted with the fluid dynamic bearing, from the standpoint of enabling the use of the disk drive unit for a long time without an operation error, it is necessary to prevent scattering of the lubricant.

In order to prevent scattering of the lubricant, disk drive units have been proposed in which a seal member having a tapered shape or a cap covering a gap between the rotating body and the stationary body is provided in a vicinity of a gas-liquid interface of the lubricant existing between the rotating body and the stationary body. Such a disk drive unit is proposed in Japanese Laid-Open Patent Publication No. 2012-205375, for example.

However, even in a case in which the seal member or the cap is provided, the lubricant may scatter and contaminate the inside of the disk drive unit when the disk drive unit receives shock. The lubricant contaminating the inside of the disk drive unit may cause various operation errors. Particularly in the case of the disk drive unit requiring high precision, it is desirable to prevent the operation errors caused by the scattering lubricant.

SUMMARY OF THE INVENTION

Embodiments of the present invention may provide a disk drive unit that captures and recovers the scattering lubricant between the rotating body and the stationary body.

According to one aspect of the present invention, a disk drive unit may include a stationary body; a rotating body rotatably supported on the stationary body; a seal part configured to form a first gas-liquid interface of a lubricant existing in a gap between the stationary body and the rotating body; and a groove-shaped opening opposing the seal part and communicating to the gap via a communication hole, wherein the seal part has a shape such that the gap gradually increases towards an aperture opposing the groove-shaped opening, and wherein the groove-shaped opening has a shape such that the gap gradually increases towards an aperture opposing the seal part.

Other objects and further features of the present invention may be apparent from the following detailed description when read in conjunction with the accompanying drawings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a cross sectional view illustrating the general configuration of the bearing mechanism of the disk drive unit in a fourth embodiment.

DESCRIPTION OF THE PREFERRED EMBODIMENTS

Figure 1A:
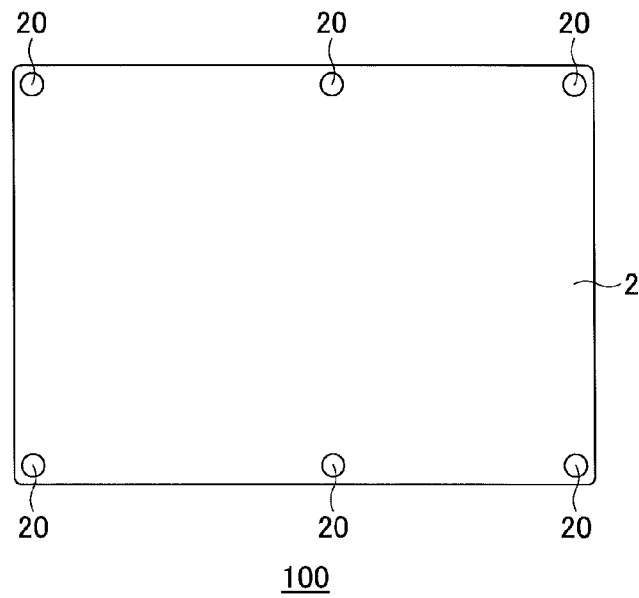
FIGS. 1A, 1B, and 1C are diagrams for explaining an example of a general configuration of a disk drive unit in a first embodiment.

In each of the figures described hereunder, those elements and parts that are the same or substantially the same are designated by the same reference numerals, and a description thereof will not be repeated where appropriate. In addition, dimensions of the parts in each of the figures are enlarged or reduced, where appropriate, in order to facilitate understanding of the parts. Further, in each of the figures, illustration of some of the parts that may be considered unimportant in describing embodiments is omitted for the sake of convenience.

First Embodiment

A description will be given of a disk drive unit 100, which is one type of a rotating device, in a first embodiment of the present invention, by referring to FIGS. 1A, 1B, 1C, and 2.

<Configuration of Disk Drive Unit>

Figure 1B:
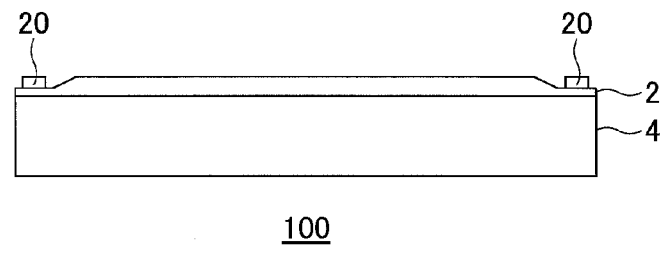
Figure 1C:
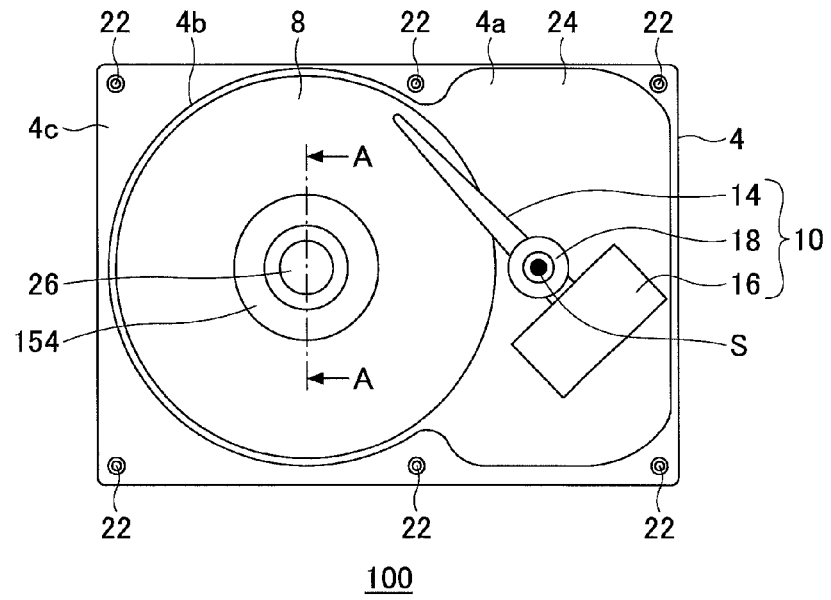

A description will be given of a general configuration of the disk drive unit 100, by referring to FIGS. 1A, 1B, and 1C. FIGS. 1A, 1B, and 1C illustrate the disk drive unit 100 in the first embodiment. FIG. 1A illustrates a top view (or plan view) of the disk drive unit 100, FIG. 1B illustrates a side view of the disk drive unit 100, and FIG. 1C illustrates a top view of the disk drive unit 100 in a state in which a top cover 2 is removed.

The disk drive unit 100 may include the top cover 2 and a base 4. A magnetic recording disk 8 and a data read and write part 10 may be provided in a space between the top cover 2 and the base 4.

In the following description, in a state in which the top cover 2 is mounted on the base 4, an end (or side) of the top cover 2 may also be referred to as an upper end (or upper side), and an end (or side) of the base 4 may also be referred to as a lower end (or lower side) of the disk drive unit 100.

(Base)

As illustrated in FIG. 1C, the base 4 may include a bottom plate part 4a that forms a bottom part of the disk drive unit 100, and an outer peripheral wall part 4b that is formed along an outer periphery of the bottom plate part 4a so as to surround a mounting region in which the magnetic recording disk 8 is to be mounted. An upper surface 4c of the outer peripheral wall part 4b includes six (6) screw holes 22 that are used to mount the top cover 2.

The surface of the base 4 may be provided with a coating in order to prevent the surface of the base 4 from peeling. The surface coating may use a resin material such as an epoxy resin, for example. Alternatively, the surface coating may be provided by plating a metal material such as nickel, chromium, or the like, for example.

(Top Cover)

As illustrated in FIGS. 1A and 1B, the top cover 2 may be fixed to the upper surface 4c of the outer peripheral wall part 4b of the base 4, by screwing six (6) screws 20 into the screw holes 22 that are provided in the upper surface 4c of the base 4. In addition, a shaft (or shaft body) 26 may be fixed to a lower surface of the base 4.

(Disk Accommodating Space)

A disk accommodating space 24 may be formed between the top cover 2 and the base 4. The disk accommodating space 24 may accommodate the magnetic recording disk 8. The disk accommodating space 24 may be filled with clean air removed of dust, in order to prevent contaminating particles from adhering onto the surface of the magnetic recording disk 8 and to improve the reliability of the operation of the disk drive unit 100. Accordingly, the top cover 2 and the base 4 are provided to seal the disk accommodating space 24 so that the dust does not enter the disk accommodating space 24 from the atmosphere.

(Data Read and Write Part)

The data read and write part 10 may include a recording and reproducing head (not illustrated), a swing arm 14, a voice coil motor 16, and a pivot assembly 18, as illustrated in FIG. 1C.

The recording and reproducing head may be mounted on a tip end of the swing arm 14, and record (or write) data to the magnetic recording disk 8 and reproduce (or read) data from the magnetic recording disk 8.

The pivot assembly 18 pivotally supports the swing arm 14 with respect to the base 4 about a head rotational axis S as its center of pivoting.

The voice coil motor 16 swings the swing arm 14 about the head rotational axis S as its center of swing, and moves the recording and reproducing head to a desired position on an upper surface of the magnetic recording disk 8. The voice coil motor 16 and the pivot assembly 18 may be formed using a known technique to control the head position.

<Configuration of Bearing Mechanism>

Figure 2:
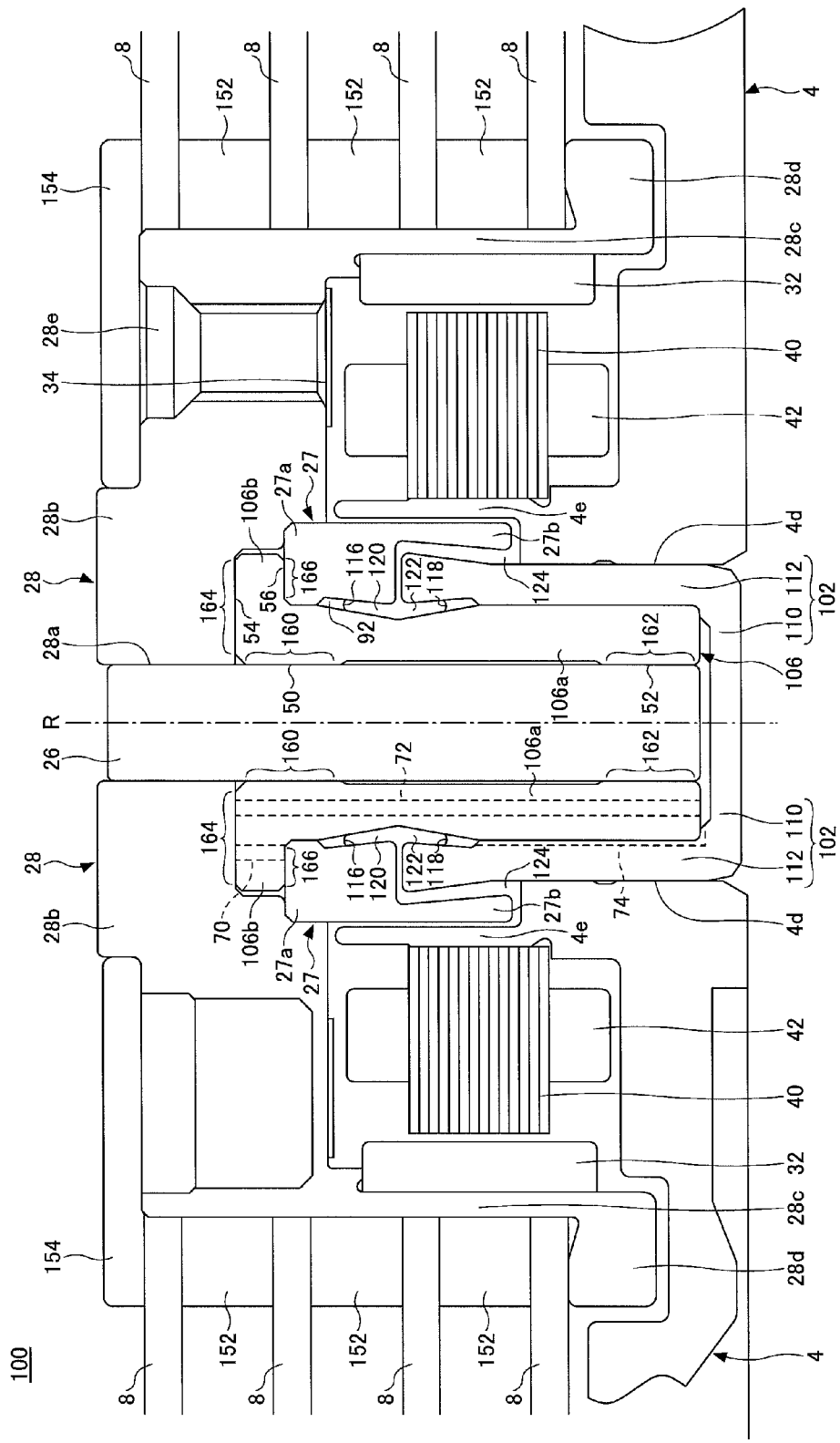
FIG. 2 is a cross sectional view illustrating a general configuration of a bearing mechanism of the disk drive unit in the first embodiment.

A description will be given of a bearing mechanism of the disk drive unit 100, by referring to FIG. 2. FIG. 2 is a cross sectional view of the disk drive unit 100 along a line A-A in FIG. 1C, illustrating the general configuration of the bearing mechanism. In the following description, a direction parallel to a rotational axis R may also be referred to as an axial direction, a direction perpendicular to the rotational axis R may also be referred to as a radial direction, an end (or side) further away from the rotational axis R along the radial direction of the magnetic recording disk 8 may also be referred to as an outer peripheral side, and an end (or side) closer to the rotational axis R along the radial direction may also be referred to as an inner peripheral side.

The disk drive unit 100 may include a rotating body that is set with the magnetic recording disk 8 and rotates, and a stationary body that rotatably supports the rotating body.

The rotating body may include a hub 28, a magnet 32, and the clamper 154. The stationary body may include the base 4, a stator core 40, a coil 42, a housing 102, and a sleeve 106. The shaft 26 and the hub 28 that is fixed to an upper end of the shaft 26 rotate in a state supported by the sleeve 106 and the housing 102. A lubricant 92 may be supplied to and provided in a gap between the shaft 26 and the sleeve 106.

(Sleeve)

The sleeve 106 may be press fit, or bonded, or press fit and bonded to the inner peripheral surface of the housing 102, to be fixed coaxially to a center hole 4d of the base 4. The sleeve 106 may include a cylindrical part 106a having a ring shape surrounding the shaft 26, and a flange part 106b extending to the outer peripheral side at an upper end of the cylindrical part 106a. Although the cylindrical part 106a and the flange part 106b of the sleeve 106 are integrally formed in this embodiment, the cylindrical part 106a and the flange part 106b may be formed by separate parts. The sleeve 106 may be formed by cutting a stainless steel material, for example. The sleeve 106 may be formed by other metals or non-metal materials.

(Hub)

The hub 28 may include a center hole 28a that is formed at a central part of the hub 28, a ring-shaped surrounding part 28b that surrounds the shaft 26 that is inserted into the center hole 28a, a cylindrical part 28c provided on the outer peripheral side of the ring-shaped surrounding part 28b, and a disk setting part 28d provided at a lower end on the outer peripheral side of the cylindrical part 28c.

A thrust member 27 may be fixed on a lower surface of the ring-shaped surrounding part 28b of the hub 28. In addition, the magnet 32 may be provided on the inner peripheral surface of the cylindrical part 28c of the hub 28. The magnet 32 may be fixed at a position opposing the stator core 40 that is provided on the base 4.

Four (4) stacked magnetic recording disks 8 having a ring-shaped spacer 152 interposed between each of two (2) mutually adjacent magnetic recording disks 8 are set on the disk setting part 28d. The magnetic recording disks 8 are fixed to the outer peripheral side of the cylindrical part 28c of the hub together with the spacers 152, by being sandwiched between the clamper 154 and the disk setting part 28d.

The hub 28 may rotate integrally with the shaft 26 that is fixed in the center hole 28a, and rotate together with the magnetic recording disks 8 that are set on the disk setting part 28d.

The hub 28 may be formed from an aluminum alloy or a stainless steel, for example. A predetermined part of the hub 28 may be formed by cutting. The hub 28 may be mounted with a back yoke that is formed from a steel plate and has a cylindrical shape to surround the magnet 32.

(Shaft)

The upper end of the shaft 26 may be press fit, or bonded, or press fit and bonded into the center hole 28a of the hub 28. A lower end of the shaft 26 may be inserted into the sleeve 106 to be surrounded by the cylindrical part 106a of the sleeve 106. The shaft 26 may be formed by cutting a stainless steel material, such as SUS420J2, for example.

(Thrust Member)

The thrust member 27 is an example of a surrounding part that surrounds the sleeve 106, and may include a ring-shaped surrounding part 27a and a downwardly extending part 27b that surrounds the housing 102. The ring-shaped surrounding part 27a of the thrust member 27 may be fixed to the lower surface of the ring-shaped surrounding part 28b of the hub 28, and the thrust member 27 may rotate together with the hub 28. The thrust member 27 may be formed by cutting a stainless steel material. Of course, the thrust member 27 may be formed from metals other than stainless steel, or resin materials.

The ring-shaped surrounding part 27a of the thrust member 27 may be provided between a lower surface of the flange part 106b of the sleeve 106 and an upper surface of a cylindrical part 112 of the housing 102, along the axial direction. The thrust member 27 may be press fit, or bonded, or press fit and bonded to the ring-shaped surrounding part 28b of the hub 28.

(Clamper)

The clamper 154 may be fixed to an upper surface of the hub 28 by a clamp screw that is screwed into a clamp screw hole 28e provided in the hub 28, for example.

(Magnet)

The magnet 32 may have a cylindrical shape and be bonded and fixed to an inner peripheral surface of the cylindrical part 28c of the hub 28. The magnet 32 may be formed from a rare earth magnetic material, a ferrite magnetic material, or the like, for example. A surface layer may be formed on a surface of the magnet 32 by electro-coating, spray coating, or the like, for example, in order to suppress corrosion. The magnet 32 may be magnetized to include, on an inner peripheral surface thereof opposing twelve (12) salient poles of the stator core 40 in the radial direction, sixteen (16) poles to be driven.

(Stator Core)

The stator core 40 may include a cylindrical part and the twelve (12) salient poles extending from the cylindrical part towards the outer peripheral side. The stator core 40 may be fixed on an upper surface of the base 4. The stator core 40 may be formed by laminating a plurality of thin magnetic steel plates. An insulator coating may be formed on a surface of the stator core 40 by electro-coating, powder coating, or the like, for example. The coil 42 may be wound on each salient pole of the stator core 40. A driving magnetic flux is generated along the salient poles when a 3-phase driving current having an approximately sinusoidal waveform flows through the coil 42.

A cylindrical base projecting part 4e may surround the thrust member 27 and project upwards from the lower surface of the base 4. The stator core 40 may be fitted to the outer peripheral surface of the base projecting part 4e, so that the outer peripheral surface of the base projecting part 4d fits into a center hole in the cylindrical part of the stator core 40. The cylindrical part of the stator core 40 may be press fit, or bonded, or press fit and bonded to the base projecting part 4e.

(Housing)

The housing 102 may include a ring-shaped shaft supporting part 110 to support the shaft 26, and the cylindrical part 112 that projects upwardly from the outer peripheral side of the shaft supporting part 110. The cylindrical part 112 may surround the lower end part of the sleeve 106 on the side of the base 4. The sleeve 106 may be press fit, or bonded, or press fit and bonded to the cylindrical part 112 of the housing 102. In addition, the housing 102 may be fixed on the base 4 by press fitting, or bonding, or press fitting and bonding the cylindrical part 112 into the center hole 4d in the base 4.

The housing 102 may be formed by connecting the shaft supporting part 110 and the cylindrical part 112 that are formed as separate parts. However, in this embodiment, the shaft supporting part 110 and the cylindrical part 112 are formed integrally.

The housing 102 may be formed from a copper alloy, a sintered alloy made by powder metallurgy, stainless steel, plastic materials such as polyetherimide, polyimide, and polyamide, and the like, for example. In a case in which the plastic material is used for the housing 102, carbon fiber may be included in the plastic material. In this embodiment, the housing 102 is formed by cutting a stainless steel material.

(Dynamic Pressure Generator)

The lubricant 92 may be supplied to and provided in a gap formed between an outer peripheral surface of the shaft 26 and an inner peripheral surface of the sleeve 106. A first radial dynamic pressure generator 160 may be formed at an upper portion of the shaft 26 between the outer peripheral surface of the shaft 26 and the inner peripheral surface of the sleeve 106, and a second radial dynamic pressure generator 162 may be formed at a lower portion of the shaft 26 between the outer peripheral surface of the shaft 26 and the inner peripheral surface of the sleeve 106. The first radial dynamic pressure generator 160 and the second radial dynamic pressure generator 162 may be formed at positions separated along the axial direction (or rotational axis R).

The sleeve 106 may include a first radial dynamic pressure generating groove 50 having a herringbone shape or a spiral shape, for example, at a portion opposing the first radial dynamic pressure generator 160. In addition, the sleeve 106 may include a second radial dynamic pressure generating groove 52 having a herringbone shape or the spiral shape, for example, at a portion opposing the second radial dynamic pressure generator 162. One of or both the first radial dynamic pressure generating groove 50 and the second radial dynamic pressure generating groove 52 may be formed on the outer peripheral surface of the shaft 26.

The lubricant 92 may be supplied to and provided in a gap formed between a lower surface of the sleeve 106 and an upper surface of the shaft supporting part 110 of the housing 102. In addition, the lubricant 92 may be supplied to and provided in a gap formed between the flange part 106b of the sleeve 106 and the ring-shaped surrounding part 28b of the hub 28, and the lubricant 92 may be supplied to and provided in a gap formed between the flange part 106b of the sleeve 106 and the ring-shaped surrounding part 27a of the thrust member 27.

A first thrust dynamic pressure generator 164 may be formed between the upper surface of the flange part 106b of the sleeve 106 and the lower surface of the ring-shaped surrounding part 28b of the hub 28. The hub 28 may include a first thrust dynamic pressure generating groove 54 having a herringbone shape or a spiral shape, for example, formed in the lower surface of the ring-shaped surrounding part 28b opposing the first thrust dynamic pressure generator 164. The first thrust dynamic pressure generating groove 54 may be formed in the upper surface of the flange part 106b of the sleeve 106, instead of being formed in the lower surface of the ring-shaped surrounding part 28b.

A second thrust dynamic pressure generator 166 may be formed between the lower surface of the flange part 106b of the sleeve 106 and an upper surface of the ring-shaped surrounding part 27a. The thrust member 27 may include a second thrust dynamic pressure generating groove 56 having a herringbone shape or a spiral shape, for example, formed in the upper surface of the ring-shaped surrounding part 27a opposing the second thrust dynamic pressure generator 166. The second thrust dynamic pressure generating groove 56 may be formed in the lower surface of the flange part 106b of the sleeve 106, instead of being formed in the upper surface of the ring-shaped surrounding part 27a.

When shaft 26 and the hub 28 rotate with respect to the sleeve 106, a dynamic pressure may be generated in the lubricant 92 at each of the first radial dynamic pressure generator 160, the second radial dynamic pressure generator 162, the first thrust dynamic pressure generator 164, and the second thrust dynamic pressure generator 166. The shaft 26 and the hub 28 may be supported along the axial direction and the radial direction by the dynamic pressure generated in the lubricant 92, in a non-contact state in which no contact is made with the sleeve 106 and the thrust member 27.

A bypass communication hole may be provided in the sleeve 106 in order to bypass predetermined regions so that a pressure difference amongst regions where the lubricant 92 is provided can be reduced. For example, a first bypass communication hole 70 may be provided in the sleeve 106 in order to bypass the first thrust dynamic pressure generator 164 and the second thrust dynamic pressure generator 166. For example, a second bypass communication hole 72 may be provided in the sleeve 106 in order to bypass the first thrust dynamic pressure generator 164 and the upper surface side and the lower surface side of the sleeve 106. The first bypass communication hole 70 and the second bypass communication hole 72 can reduce the pressure difference amongst the regions where the lubricant 92 is provided, in order to maintain a stable behavior of the lubricant 92.

(Lubricant)

The lubricant 92 may include a fluorescent material. When light such as ultraviolet ray or the like is irradiated on the lubricant 92, the lubricant 92 may emit light having a wavelength different from that of the blue or green light irradiated thereon, for example, due to the function of the fluorescent material.

(Seal Part)

A seal part 120 to hold a first gas-liquid interface 116 of the lubricant 92 may be formed between the outer peripheral surface of the cylindrical part 106a of the sleeve 106 and the inner peripheral surface of the ring-shaped surrounding part 27a of the thrust member 27.

The outer peripheral surface of the cylindrical part 106a of the sleeve 106 may have a tapered shape that is inclined at the seal part 120 so that a gap between the outer peripheral surface of the cylindrical part 106a and the inner peripheral surface of the ring-shaped surrounding part 27a of the thrust member 27 gradually increases towards the downward direction. According to the seal part 120 having a shape such that the gap between the outer peripheral surface of the cylindrical part 106a and the inner peripheral surface of the ring-shaped surrounding part 27a gradually increases towards an aperture opposing a groove-shaped opening 122 to be described below, a force acts on the lubricant 92 towards the upward direction in which the gap decreases, and thus, the lubricant 92 can be sealed between the sleeve 106 and the thrust member 27.

The groove-shaped opening 122 may be formed in a gap between the outer peripheral surface of the cylindrical part 106a of the sleeve 106 and the inner peripheral surface of the cylindrical part 112 of the housing 102, at a position opposing the sealing member 120 along the axial direction. The outer peripheral surface of the cylindrical part 106a of the sleeve 106 may have a tapered shape that is inclined at the groove-shaped opening 122 so that the gap between the outer peripheral surface of the cylindrical part 106a and the inner peripheral surface of the cylindrical part 112 of the housing 102 gradually increases towards the upward direction. In other words, the groove-shaped opening 122 has a shape such that the gap between the outer peripheral surface of the cylindrical part 106a and the inner peripheral surface of the cylindrical part 112 gradually increases towards an aperture opposing the seal part 120.

The opening 122 may communicate to a gap between an upper surface of the shaft supporting part 110 of the housing 102 and the lower surface of the sleeve 106, via a communication hole 74 that is formed between the outer peripheral surface of the cylindrical part 106a of the sleeve 106 and the inner peripheral surface of the cylindrical part 112 of the housing 102. In a case in which the lubricant 92 exists within the communication hole 74, the lubricant 92 is provided in the groove-shaped opening 122 to form a second gas-liquid interface 118.

In the case in which the second gas-liquid interface 118 is formed, the groove-shaped opening 122 can also function as a capillary seal to hold the lubricant 92 by the force of capillary action. Because the force of the capillary action acts towards the downward direction in which the groove-shaped opening 122 decreases, the lubricant 92 can be sealed between the sleeve 106 and the housing 102.

Because the seal part 120 to hold the first gas-liquid interface 116 of the lubricant 92, and the groove-shaped opening 122, are provided in an opposing manner along the axial direction, even in a case in which the disk drive unit 100 receives shock in the axial direction and the lubricant 92 scatters from the first gas-liquid interface 116, the scattered lubricant 92 can be captured by the groove-shaped opening 122. The lubricant 92 captured by the groove-shaped opening 122 may be recovered, via the communication hole 74, into a gap between the shaft 26 and the sleeve 106.

In addition, even in a case in which the disk drive unit 100 similarly receives shock in the axial direction and the lubricant 92 scatters from the groove-shaped opening 122, the scattered lubricant 92 can be captured by the seal part 120. The lubricant 92 captured by the seal part 120 may be recovered into a gap between the thrust member 27 and the sleeve 106.

Accordingly, even in the case in which the disk drive unit 100 receives shock and the lubricant 92 scatters from the seal part 120 or the groove-shaped opening 122, the scattered lubricant 92 can be captured by the groove-shaped opening 122 or the seal part 120 that is provided in an opposing manner. For this reason, it is possible to reduce an operation error that would otherwise occur when reading information from or writing information to the magnetic recording disk 8 if the lubricant 92 were to scatter inside the disk drive unit 100 and contaminate the surface of the magnetic recording disk 8.

Aperture areas of the seal part 120 and the groove-shaped opening 122 may be mutually different. By using mutually different aperture areas for the seal part 120 and the groove-shaped opening 122, the seal part 120 or the groove-shaped opening 122 having the larger aperture area can easily capture the lubricant 92 and further reduce the contamination within the disk drive unit 100 caused by the lubricant 92.

A labyrinth seal 124 may be formed spanning the thrust member 27, the cylindrical part 112 of the housing 102, and the base projecting part 4e of the base 4, at a part from between the seal part 120 and the groove-shaped opening 122 and communicating to a space in which the stator core 40 and the coil 42 are accommodated.

The labyrinth seal 124 may be formed by a gap formed in the axial direction or the radial direction, between the lower surface of the ring-shaped surrounding part 27a of the thrust member 27 and an upper surface of the cylindrical part 112 of the housing 102, between an inner peripheral surface of the downwardly extending part 27b of the thrust member 27 and an outer peripheral surface of the cylindrical part 112 of the housing 102, and between an outer peripheral surface of the thrust member 27 and an inner peripheral surface of the base projecting part 4e of the base 4.

The lubricant 92 scattered from the seal part 120 or the groove-shaped opening 122 adheres within a passage of the labyrinth seal 124, even when not captured by the opposing opening 122 or seal part 120. Hence, it is possible to prevent the scattered lubricant 92 from adhering onto the surface of the magnetic recording disk 8.

As described above, according to the disk drive unit 100 in the first embodiment, the lubricant 92 scattered from the seal part 120 or the groove-shaped opening 122 can be captured and recovered by the opposing opening 122 or seal part 120. For this reason, the contamination within the disk drive unit 100 caused by the scattered lubricant 92 can be reduced, and the operation error or the like caused by the scattered lubricant 92 can be prevented.

Second Embodiment

Next, a description will be given of a second embodiment. A description of those parts of the second embodiment that are the same as those corresponding parts of the first embodiment described above will be omitted.

Figure 3:
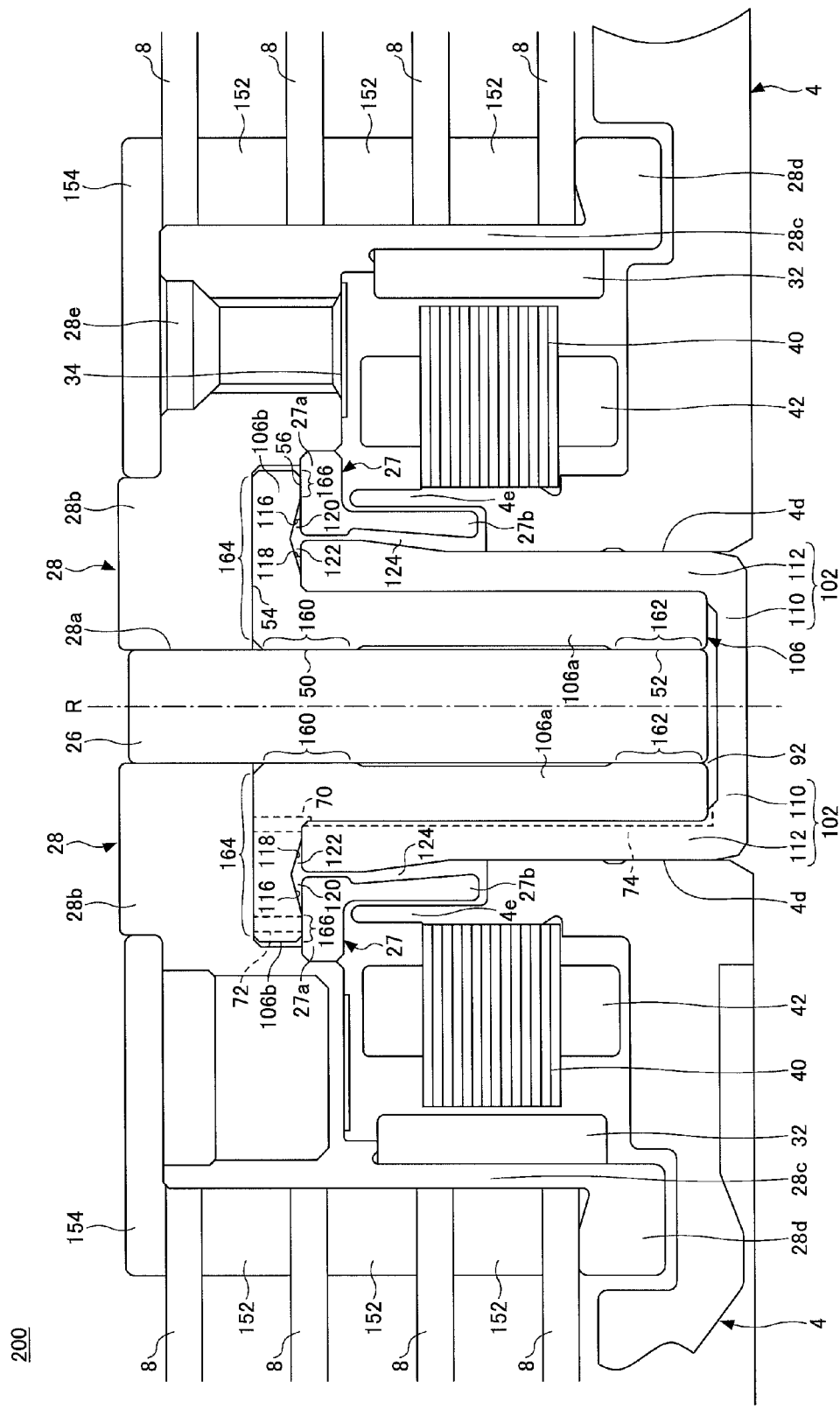
FIG. 3 is a cross sectional view illustrating the general configuration of the bearing mechanism of the disk drive unit in a second embodiment.

FIG. 3 is a cross sectional view of a disk drive unit 200 in the second embodiment, at a part similar to that of the cross section illustrated in FIG. 2, illustrating the general configuration of the bearing mechanism.

In FIG. 3, a first bypass communication hole 70 that bypasses the first thrust dynamic pressure generator 164 and a communication hole 74 may be provided in the sleeve 106. In addition, a second bypass communication hole 72 that bypasses the first thrust dynamic pressure generator 164 and the second thrust dynamic pressure generator 166 may be provided in the flange part 106b of the sleeve 106. The first bypass communication hole 70 and the second bypass communication hole 72 can reduce the pressure difference amongst the regions where the lubricant 92 is provided, in order to maintain a stable behavior of the lubricant 92.

(Seal Part)

A seal part 120 to hold a first gas-liquid interface 116 of the lubricant 92 may be formed between a lower surface of the flange part 106b of the sleeve 106 on the outer peripheral side and the upper surface of the ring-shaped surrounding part 27a of the thrust member 27.

The lower surface of the flange part 106b of the sleeve 106 may have a tapered shape that is inclined at the seal part 120 so that a gap between the lower surface of the flange part 106b and the upper surface of the ring-shaped surrounding part 27a of the thrust member 27 gradually increases towards the inner peripheral side. According to the seal part 120 having a shape corresponding to the gap between the lower surface of the flange part 106b and the upper surface of the ring-shaped surrounding part 27a, a force acts on the lubricant 92 in a direction towards the outer peripheral side in which the gap decreases, and thus, the lubricant 92 can be sealed between the sleeve 106 and the thrust member 27.

A groove-shaped opening 122 may be formed between the lower surface of the flange part 106b of the sleeve 106 and the upper surface of the cylindrical part 112 of the housing 102, at a position opposing the sealing member 120 along the radial direction. The lower surface of the flange part 106b of the sleeve 106 may have a tapered shape that is inclined at the groove-shaped opening 122 so that the groove-shaped opening 122 between the lower surface of the flange part 106b and the upper surface of the cylindrical part 112 of the housing 102 gradually increases in the direction towards the outer peripheral side.

Because the seal part 120 to hold the first gas-liquid interface 116 of the lubricant 92 and the groove-shaped opening 122 are provided in an opposing manner along the radial direction, even in a case in which the disk drive unit 200 receives shock in the radial direction and the lubricant 92 scatters from the first gas-liquid interface 116, the scattered lubricant 92 can be captured by the groove-shaped opening 122. The lubricant 92 captured by the groove-shaped opening 122 may be recovered, via the communication hole 74, into a gap between the shaft 26 and the sleeve 106.

In addition, even in a case in which the disk drive unit 200 similarly receives shock in the radial direction and the lubricant 92 scatters from the groove-shaped opening 122, the scattered lubricant 92 can be captured by the seal part 120. The lubricant 92 captured by the seal part 120 may be recovered into a gap between the thrust member 27 and the sleeve 106.

Accordingly, even in the case in which the disk drive unit 200 receives shock and the lubricant 92 scatters from the seal part 120 or the groove-shaped opening 122, the scattered lubricant 92 can be captured by the groove-shaped opening 122 or the seal part 120 that is provided in an opposing manner. For this reason, it is possible to reduce an operation error that would otherwise occur when reading information from or writing information to the magnetic recording disk 8 if the lubricant 92 were to scatter inside the disk drive unit 200 and contaminate the surface of the magnetic recording disk 8.

A labyrinth seal 124 may be formed spanning the thrust member 27, the cylindrical part 112 of the housing 102, and the base projecting part 4e of the base 4, at a part from between the seal part 120 and the groove-shaped opening 122 and communicating to a space in which the stator core 40 and the coil 42 are accommodated.

The labyrinth seal 124 may be formed by a gap formed between the inner peripheral surface of the downwardly extending part 27b of the thrust member 27 and the outer peripheral surface of the cylindrical part 112 of the housing 102, and between the outer peripheral surface of the downwardly extending part 27b of the thrust member 27 and the inner peripheral surface of the base projecting part 4e of the base 4.

The lubricant 92 scattered from the seal part 120 or the groove-shaped opening 122 adheres within a passage of the labyrinth seal 124, even when not captured by the opposing opening 122 or seal part 120. Hence, it is possible to prevent the scattered lubricant 92 from adhering onto the surface of the magnetic recording disk 8.

As described above, according to the disk drive unit 200 in the second embodiment, the lubricant 92 scattered from the seal part 120 or the groove-shaped opening 122 can be captured and recovered by the opposing opening 122 or seal part 120. For this reason, the contamination within the disk drive unit 200 caused by the scattered lubricant 92 can be reduced, and the operation error or the like caused by the scattered lubricant 92 can be prevented.

Third Embodiment

Next, a description will be given of a third embodiment. A description of those parts of the third embodiment that are the same as those corresponding parts of the embodiments described above will be omitted.

Figure 4:
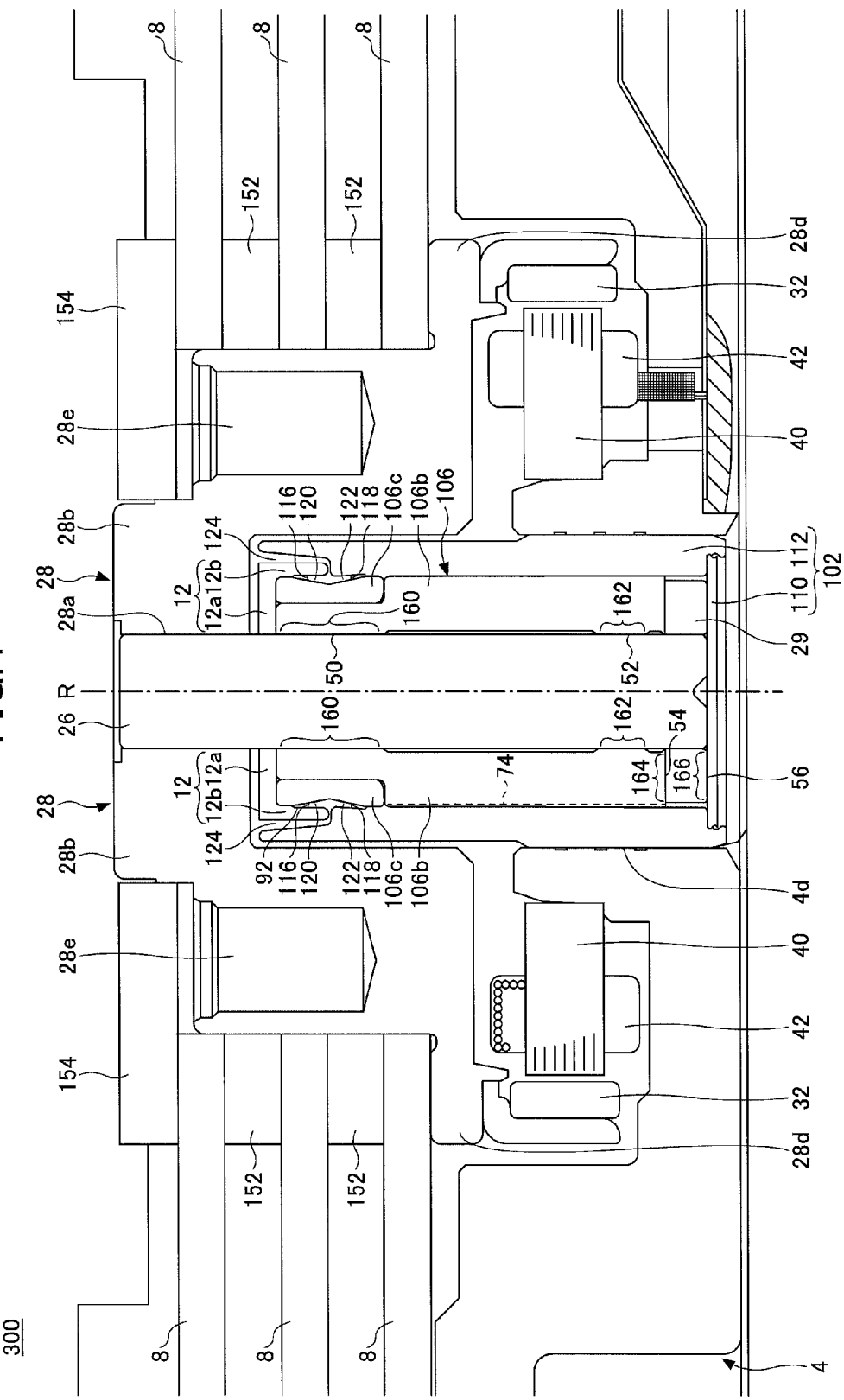
FIG. 4 is a cross sectional view illustrating the general configuration of the bearing mechanism of the disk drive unit in a third embodiment.

FIG. 4 is a cross sectional view of a disk drive unit 300 in the third embodiment, at a part similar to that of the cross section illustrated in FIG. 2, illustrating the general configuration of the bearing mechanism.

(Sleeve)

The sleeve 106 may be press fit, or bonded, or press fit and bonded to the inner peripheral surface of the housing 102, to be fixed coaxially to the center hole 4d of the base 4. The sleeve 106 may include a cylindrical part 106a having a ring shape surrounding the shaft 26, and a ring-shaped part 106c that is press fit on the upper end of the cylindrical part 106a. Although the cylindrical part 106a and the ring-shaped part 106c of the sleeve 106 are formed by separate parts in this embodiment, the cylindrical part 106a and the ring-shaped part 106c may be integrally formed by a single part. The ring-shaped part 106c may be formed by cutting a stainless steel material, for example. The ring-shaped part 106c may be formed by other metals or non-metal materials.

(Shaft)

The upper end of the shaft 26 may be press fit, or bonded, or press fit and bonded into the center hole 28a of the hub 28. The lower end of the shaft 26 may be press fit into and fixed to a flange 29. The lubricant 92 may be supplied to and provided in a gap between the shaft 26 and the sleeve 106, a gap between an upper surface of the flange 29 and the lower surface of the sleeve 106, and a gap between an outer peripheral surface of the flange 29 and the inner peripheral surface of the cylindrical part 112 of the housing 102. The lubricant 92 may also be supplied to and provided in a gap between the lower surface of the flange 29 and a shaft supporting part 110 of the housing 102, and a gap between the lower surface of the shaft 26 and the shaft supporting part 110 of the housing 102.

(Cap)

A cap 12 may be provided on the shaft 26 between the hub 28 and the sleeve 106. The cap 12 may be press fit, or bonded, or press fit and bonded on the shaft 26, to be fixed on the shaft 26. The cap 12 may be fixed to the hub 28. The cap 12 may be formed by cutting a stainless steel material, for example. The cap 12 may be formed by other metals or non-metal materials.

The cap 12 may include a ring-shaped part 12a surrounding the shaft 26, and a downwardly extending part 12b extending downwardly from an end part on the outer peripheral side of the ring-shaped part 12a. The downwardly extending part 12b may surround the sleeve 106. The cap 12 may rotate together with the shaft 26.

(Housing)

The housing 102 may include the ring-shaped shaft supporting part 110 to support the shaft 26 and the flange 29, and the cylindrical part 112 that projects upwardly from the outer peripheral side of the shaft supporting part 110. The cylindrical part 112 may surround the flange 29, the sleeve 106, and the cap 12. The sleeve 106 and the shaft supporting part 110 may be press fit, or bonded, or press fit and bonded to the cylindrical part 112 of the housing 102. In addition, the housing 102 may be fixed on the base 4 by press fitting, or bonding, or press fitting and bonding the cylindrical part 112 into the center hole 4d in the base 4. The shaft supporting part 110 and the cylindrical part 112 may be formed integrally on the housing 102.

(Dynamic Pressure Generator)

The lubricant 92 may be supplied to and provided in a gap formed between the outer peripheral surface of the shaft 26 and the inner peripheral surface of the sleeve 106. A first radial dynamic pressure generating part 160 may be formed at an upper portion of the shaft 26 between the outer peripheral surface of the shaft 26 and the inner peripheral surface of the sleeve 106, and a second radial dynamic pressure generator 162 may be formed at a lower portion of the shaft 26 between the outer peripheral surface of the shaft 26 and the inner peripheral surface of the sleeve 106. The first radial dynamic pressure generator 160 and the second radial dynamic pressure generator 162 may be formed at positions separated along the axial direction (or rotational axis R). A first radial dynamic pressure generating groove 50 having a herringbone shape or a spiral shape, for example, may be formed in the inner peripheral surface of the sleeve 106 or the outer peripheral surface of the shaft 26, at a portion opposing the first radial dynamic pressure generator 160. In addition, a second radial dynamic pressure generating groove 52 having a herringbone shape or the spiral shape, for example, may be formed in the inner peripheral surface of the sleeve 106 or the outer peripheral surface of the shaft 26, at a portion opposing the second radial dynamic pressure generator 162.

The lubricant 92 may be supplied to and provided in a gap formed between the lower surfaces of the shaft 26 and the flange 29 and the upper surface of the shaft supporting part 110 of the housing 102. In addition, the lubricant 92 may be supplied to and provided in a gap formed between the upper surface of the flange 29 and the lower surface of the sleeve 106, and the lubricant 92 may be supplied to and provided in a gap formed between the outer peripheral surface of the flange 29 and the inner peripheral surface of the cylindrical part 112 of the housing 102.

A first thrust dynamic pressure generator 164 may be formed between the upper surface of the flange 29 and the lower surface of the cylindrical part 106a of the sleeve 106. The sleeve 106 may include a first thrust dynamic pressure generating groove 54 having a herringbone shape or a spiral shape, for example, formed in the lower surface of the sleeve 106 opposing the first thrust dynamic pressure generator 164. The first thrust dynamic pressure generating groove 54 may be formed in the upper surface of the flange 29, instead of being formed in the lower surface of the sleeve 106.

A second thrust dynamic pressure generator 166 may be formed between the lower surface of the flange 29 and the upper surface of the shaft supporting part 110 of the housing 102. The flange 29 may include a second thrust dynamic pressure generating groove 56 having a herringbone shape or a spiral shape, for example, formed in the lower surface of the flange 29 opposing the second thrust dynamic pressure generator 166. The second thrust dynamic pressure generating groove 56 may be formed in the upper surface of the shaft supporting part 110 of the housing 102, instead of being formed in the lower surface of the flange 29.

When shaft 26, flange 29, and the hub 28 rotate with respect to the sleeve 106, a dynamic pressure may be generated in the lubricant 92 at each of the first radial dynamic pressure generator 160, the second radial dynamic pressure generator 162, the first thrust dynamic pressure generator 164, and the second thrust dynamic pressure generator 166. The shaft 26, the flange 29, and the hub 28 may be supported along the axial direction and the radial direction by the dynamic pressure generated in the lubricant 92, in a non-contact state in which no contact is made with the sleeve 106 and the thrust member 27.

(Seal Part)

A seal part 120 to hold a first gas-liquid interface 116 of the lubricant 92 may be formed between the outer peripheral surface of the ring-shaped part 106c of the sleeve 106 on the upper end side and the inner peripheral surface of the downwardly extending part 12b of the cap 12.

The outer peripheral surface of the ring-shaped part 106c of the sleeve 106 may have a tapered shape that is inclined at the seal part 120 so that a gap between the outer peripheral surface of the ring-shaped part 106c and the inner peripheral surface of the downwardly extending part 12b of the cap 12 gradually increases towards the downward direction. According to the seal part 120 having a shape corresponding to the gap between the outer peripheral surface of the ring-shaped part 106c and the inner peripheral surface of the downwardly extending part 12b, a force acts on the lubricant 92 in a direction towards the upward direction in which the gap decreases, and thus, the lubricant 92 can be sealed between the sleeve 106 and the cap 12.

A groove-shaped opening 122 may be formed between the outer peripheral surface of the ring-shaped part 106c of the sleeve 106 on the lower end side and the inner peripheral surface of the cylindrical part 112 of the housing 102, at a position opposing the sealing member 120 along the axial direction. The outer peripheral surface of the ring-shaped part 106c of the sleeve 106 may have a tapered shape that is inclined at the groove-shaped opening 122 so that the groove-shaped opening 122 between the outer peripheral surface of the ring-shaped part 106c and the inner peripheral surface of the cylindrical part 112 of the housing 102 gradually increases towards the upward direction.

The opening 122 may communicate to a gap between the lower surface of the sleeve 106 and the upper surface of the flange 29, via a communication hole 74 that is formed between the outer peripheral surface of the ring-shaped part 106c of the sleeve 106 and the inner peripheral surface of the cylindrical part 112 of the housing 102. In a case in which the lubricant 92 exists within the communication hole 74, the lubricant 92 is provided in the groove-shaped opening 122 to form a second gas-liquid interface 118.

Because the seal part 120 to hold the first gas-liquid interface 116 of the lubricant 92 and the groove-shaped opening 122 are provided in an opposing manner along the axial direction, even in a case in which the disk drive unit 300 receives shock in the axial direction and the lubricant 92 scatters from the first gas-liquid interface 116, the scattered lubricant 92 can be captured by the groove-shaped opening 122. The lubricant 92 captured by the groove-shaped opening 122 may be recovered, via the communication hole 74, into a gap between the shaft 26 and the sleeve 106.

In addition, even in a case in which the disk drive unit 300 similarly receives shock in the axial direction and the lubricant 92 scatters from the groove-shaped opening 122, the scattered lubricant 92 can be captured by the seal part 120. The lubricant 92 captured by the seal part 120 may be recovered into a gap between the thrust member 27 and the sleeve 106.

Accordingly, even in the case in which the disk drive unit 300 receives shock and the lubricant 92 scatters from the seal part 120 or the groove-shaped opening 122, the scattered lubricant 92 can be captured by the groove-shaped opening 122 or the seal part 120 that is provided in an opposing manner. For this reason, it is possible to reduce an operation error that would otherwise occur when reading information from or writing information to the magnetic recording disk 8 if the lubricant 92 were to scatter inside the disk drive unit 300 and contaminate the surface of the magnetic recording disk 8.

A labyrinth seal 124 may be formed between the cylindrical part 112 of the housing 102 and the base projecting part 4e of the base 4, at a part from between the seal part 120 and the groove-shaped opening 122 and communicating to a space in which the stator core 40 and the coil 42 are accommodated.

The labyrinth seal 124 may be formed by a gap formed between the outer peripheral surface of the downwardly extending part 12b of the cap 12 and the inner peripheral surface of the cylindrical part 112 of the housing 102, and between the outer peripheral surface of the cylindrical part 112 of the housing 102 and the inner peripheral surface of the ring-shaped surrounding part 28b of the hub 28.

The lubricant 92 scattered from the seal part 120 or the groove-shaped opening 122 adheres within a passage of the labyrinth seal 124, even when not captured by the opposing opening 122 or seal part 120. Hence, it is possible to prevent the scattered lubricant 92 from adhering onto the surface of the magnetic recording disk 8.

As described above, according to the disk drive unit 300 in the third embodiment, the lubricant 92 scattered from the seal part 120 or the groove-shaped opening 122 can be captured and recovered by the opposing opening 122 or seal part 120. For this reason, the contamination within the disk drive unit 300 caused by the scattered lubricant 92 can be reduced, and the operation error or the like caused by the scattered lubricant 92 can be prevented.

Fourth Embodiment

Next, a description will be given of a fourth embodiment. A description of those parts of the fourth embodiment that are the same as those corresponding parts of the embodiments described above will be omitted.

FIG. 5 is a cross sectional view of a disk drive unit 400 in the fourth embodiment, at a part similar to that of the cross section illustrated in FIG. 2, illustrating the general configuration of the bearing mechanism.

The rotating body may include the shaft 26, the flange 29, the hub 28, the magnet 32, and the clamper 154. The stationary body may include the base 4, the stator core 40, the coil 42, the housing 102, and the sleeve 106. The shaft 26 and the hub 28 that is fixed to the upper end of the shaft 26 rotate in a state supported by the sleeve 106 and the housing 102. The lubricant 92 may be supplied to and provided in the gap between the shaft 26 and the sleeve 106.

A lower surface side of a ring-shaped surrounding part 28b of the hub 28 has a staircase shape, in order to surround mutually different positions along the axial direction, that is, the upper end part of the shaft 26, the upper end part of the ring-shaped part 106c of the sleeve 106, and the upper end part of the cylindrical part 112 of the housing 102.

(Seal Part)

A seal part 120 to hold a first gas-liquid interface 116 of the lubricant 92 may be formed between the outer peripheral surface of the ring-shaped part 106c of the sleeve 106 on the upper end side and the inner peripheral surface of the ring-shaped surrounding part 28b of the hub 28.

The outer peripheral surface of the ring-shaped part 106c of the sleeve 106 may have a tapered shape that is inclined at the seal part 120 so that a gap between the outer peripheral surface of the ring-shaped part 106c and the inner peripheral surface of the ring-shaped surrounding part 28b of the hub 28 gradually increases towards the downward direction. According to the seal part 120 having a shape corresponding to the gap between the outer peripheral surface of the ring-shaped part 106c and the inner peripheral surface of the ring-shaped surrounding part 28b, a force acts on the lubricant 92 towards the upward direction in which the gap decreases, and thus, the lubricant 92 can be sealed between the sleeve 106 and the hub 28.

A groove-shaped opening 122 may be formed between the outer peripheral surface of the ring-shaped part 106c of the sleeve 106 on the lower end side and the inner peripheral surface of the cylindrical part 112 of the housing 102, at a position opposing the sealing member 120 along the axial direction. The outer peripheral surface of the ring-shaped part 106c of the sleeve 106 may have a tapered shape that is inclined at the groove-shaped opening 122 so that the groove-shaped opening 122 between the outer peripheral surface of the ring-shaped part 106c and the inner peripheral surface of the cylindrical part 112 of the housing 102 gradually increases towards the upward direction.

The opening 122 may communicate to a gap between the lower surface of the sleeve 106 and the upper surface of the flange 29, via a communication hole 74 that is formed between the outer peripheral surface of the ring-shaped part 106c of the sleeve 106 and the inner peripheral surface of the cylindrical part 112 of the housing 102. In a case in which the lubricant 92 exists within the communication hole 74, the lubricant 92 is provided in the groove-shaped opening 122 to form a second gas-liquid interface 118.

In the case in which the second gas-liquid interface 118 is formed, the groove-shaped opening 122 can also function as a capillary seal to hold the lubricant 92 by the force of capillary action. Because the force of the capillary action acts towards the downward direction in which the groove-shaped opening 122 decreases, the lubricant 92 can be sealed between the ring-shaped part 106c of the sleeve 106 and the housing 102.

Because the seal part 120 to hold the first gas-liquid interface 116 of the lubricant 92 and the groove-shaped opening 122 are provided in an opposing manner along the axial direction, even in a case in which the disk drive unit 400 receives shock in the axial direction and the lubricant 92 scatters from the first gas-liquid interface 116, the scattered lubricant 92 can be captured by the groove-shaped opening 122. The lubricant 92 captured by the groove-shaped opening 122 may be recovered, via the communication hole 74, into a gap between the shaft 26 and the sleeve 106.

In addition, even in a case in which the disk drive unit 400 similarly receives shock in the axial direction and the lubricant 92 scatters from the groove-shaped opening 122, the scattered lubricant 92 can be captured by the seal part 120. The lubricant 92 captured by the seal part 120 may be recovered into a gap between the hub 28 and the sleeve 106.

Accordingly, even in the case in which the disk drive unit 400 receives shock and the lubricant 92 scatters from the seal part 120 or the groove-shaped opening 122, the scattered lubricant 92 can be captured by the groove-shaped opening 122 or the seal part 120 that is provided in an opposing manner. For this reason, it is possible to reduce an operation error that would otherwise occur when reading information from or writing information to the magnetic recording disk 8 if the lubricant 92 were to scatter inside the disk drive unit 400 and contaminate the surface of the magnetic recording disk 8.

A labyrinth seal 124 may be formed spanning the ring-shaped surrounding part 28b of the hub 28, the cylindrical part 112 of the housing 102, and the base projecting part 4e of the base 4, at a part from between the seal part 120 and the groove-shaped opening 122 and communicating to a space in which the stator core 40 and the coil 42 are accommodated.

The labyrinth seal 124 may be formed by a gap formed in the axial direction or the radial direction, between the ring-shaped surrounding part 28b of the hub 28 and the cylindrical part 112 of the housing 102, and between the ring-shaped surrounding part 28b of the hub 28 and the base projecting part 4e of the base 4.

The lubricant 92 scattered from the seal part 120 or the groove-shaped opening 122 adheres within a passage of the labyrinth seal 124, even when not captured by the opposing opening 122 or seal part 120. Hence, it is possible to prevent the scattered lubricant 92 from adhering onto the surface of the magnetic recording disk 8.

As described above, according to the disk drive unit 400 in the fourth embodiment, the lubricant 92 scattered from the seal part 120 or the groove-shaped opening 122 can be captured and recovered by the opposing opening 122 or seal part 120. For this reason, the contamination within the disk drive unit 400 caused by the scattered lubricant 92 can be reduced, and the operation error or the like caused by the scattered lubricant 92 can be prevented.

The shaft 26 and the hub 28 of the disk drive unit rotate together or unitarily in each of the first through fourth embodiments described above. However, the present invention is not limited to such a configuration, and the present invention may be applied similarly to a type of magnetic disk unit in which the shaft is fixed on the base and does not rotate.

According to each of the embodiments, it is possible to capture and recover the scattering lubricant between the rotating body and the stationary body.

Although the embodiments are numbered with, for example, "first," "second," or "third," or "fourth," the ordinal numbers do not imply priorities of the embodiments.

Although the embodiments of the present invention have been described in detail, it should be understood that the various changes, substitutions, and alterations could be made hereto without departing from the spirit and scope of the invention.

What is claimed is:

1. A disk drive unit comprising:
a stationary body;
a rotating body rotatably supported on the stationary body;
a seal part configured to form a first gas-liquid interface of a lubricant existing in a gap between the stationary body and the rotating body; and
a groove-shaped opening opposing the seal part and communicating to the gap via a communication hole,
wherein the seal part has a shape such that the gap gradually increases towards an aperture opposing the groove-shaped opening,
wherein the groove-shaped opening has a shape such that the gap gradually increases towards an aperture opposing the seal part, and
wherein the seal part and the groove-shaped opening are arranged to oppose each other along a direction perpendicular to a rotational axis of the rotating body.

2. The disk drive unit as claimed in claim 1, wherein an aperture area of the seal part and an aperture area of the groove-shaped opening are different.

3. The disk drive unit as claimed in claim 1, wherein
the rotating body includes a shaft which is fixed to a hub on which a recording disk is set, and a surrounding part which surrounds a sleeve,
the stationary body includes the sleeve which surrounds the shaft, and a housing which fixedly holds the sleeve,
the seal part is formed between the sleeve and the surrounding part, and
the groove-shaped opening is formed between the sleeve and the housing.

4. The disk drive unit as claimed in claim 1, wherein the groove-shaped opening is configured to form a second gas-liquid interface of the lubricant.

5. A disk drive unit comprising:
a stationary body;
a rotating body rotatably supported on the stationary body;
a seal part configured to form a first gas-liquid interface of a lubricant existing in a gap between the stationary body and the rotating body; and
a groove-shaped opening opposing the seal part and communicating to the gap via a communication hole,
wherein the seal part has a shape such that the gap gradually increases towards an aperture opposing the groove-shaped opening, and
wherein the seal part and the groove-shaped opening are arranged to oppose each other along a direction perpendicular to a rotational axis of the rotating body.

6. The disk drive unit as claimed in claim 5, wherein the groove-shaped opening has a shape such that the gap gradually increases towards an aperture opposing the seal part.

7. The disk drive unit as claimed in claim 5, wherein an aperture area of the seal part and an aperture area of the groove-shaped opening are different.

8. The disk drive unit as claimed in claim 5, wherein
the rotating body includes a shaft which is fixed to a hub on which a recording disk is set, and a surrounding part which surrounds a sleeve,
the stationary body includes the sleeve which surrounds the shaft, and a housing which fixedly holds the sleeve,
the seal part is formed between the sleeve and the surrounding part, and
the groove-shaped opening is formed between the sleeve and the housing.

9. The disk drive unit as claimed in claim 5, wherein the groove-shaped opening is configured to form a second gas-liquid interface of the lubricant.

10. A disk drive unit comprising:
a stationary body;
a rotating body rotatably supported on the stationary body;
a seal part configured to form a first gas-liquid interface of a lubricant existing in a gap between the stationary body and the rotating body; and
a groove-shaped opening opposing the seal part and communicating to the gap via a communication hole,
wherein the lubricant exists in the communication hole and the groove-shaped opening, and,
wherein the seal part and the groove-shaped opening are arranged to oppose each other along a direction perpendicular to a rotational axis of the rotating body.

11. The disk drive unit as claimed in claim 10, wherein the seal part has a shape such that the gap gradually increases towards an aperture opposing the groove-shaped opening.

12. The disk drive unit as claimed in claim 10, wherein the opening has a shape such that the gap gradually increases towards an aperture opposing the seal part.

13. The disk drive unit as claimed in claim 10, wherein an aperture area of the seal part and an aperture area of the groove-shaped opening are different.

14. The disk drive unit as claimed in claim 10, wherein
the rotating body includes a shaft which is fixed to a hub on which a recording disk is set, and a surrounding part which surrounds a sleeve,
the stationary body includes the sleeve which surrounds the shaft, and a housing which fixedly holds the sleeve,
the seal part is formed between the sleeve and the surrounding part, and
the groove-shaped opening is formed between the sleeve and the housing.

\* \* \* \* \*